United States Patent
Fick et al.

[15] 3,693,017
[45] Sept. 19, 1972

[54] POWER SUPPLY FOR IMAGE CONVERTER

[72] Inventors: Franz Fick, Kiefernberg 19, 21 Hamburg-Harburg; Otto Kobelentz, 63, Schmickshohe 4c, 2 Hamburg, both of Germany

[22] Filed: Feb. 22, 1971

[21] Appl. No.: 117,637

[52] U.S. Cl. ............... 250/213 VT, 313/94, 310/8.1
[51] Int. Cl. ............................................. H01j 31/50
[58] Field of Search ........ 250/213 VT; 313/2, 94, 95, 313/99; 310/8, 8.1, 75 B

[56] References Cited

UNITED STATES PATENTS

| | | | |
|---|---|---|---|
| 3,073,989 | 1/1963 | Amsterdam | 250/213 VT X |
| 2,692,300 | 10/1954 | Hogan | 250/213 VT X |
| 3,177,390 | 4/1965 | Hickey | 313/99 |

OTHER PUBLICATIONS

Design News; Oct. 13, 1969, (TS149.D46)

*Primary Examiner*—Walter Stolwein
*Attorney*—Frank R. Trifari

[57] ABSTRACT

A viewing apparatus which includes an image converter tube having a cathode and a phosphorous screen for visual observation is powered by a pair of piezoelectric converters circuityly arranged with a common connection to the cathode of the image converter tube and with each having a second connection to the anodes of a high-vacuum rectifier; the high-vacuum rectifier also includes a photo-cathode which is disposed in light receiving arrangement with the phosphorous screen of the image converter tube; a capacitor is disposed in parallel connection with said piezoelectric converters and said high-vacuum rectifier across the cathode and phosphorous screen of the image converter tube so that the piezoelectric converters and the high-vacuum rectifier when activated build up a charge across the capacitor for powering the image converter tube.

6 Claims, 2 Drawing Figures

INVENTORS
FRANZ FICK
BY OTTO KOBELENTZ

AGENT

POWER SUPPLY FOR IMAGE CONVERTER

The invention relates to a viewing apparatus comprising a manually actuated piezoelectric converter, the voltage of which is applied through a rectifier, a charging capacitor to an image converter tube.

It is known from the review "Design News" of Oct. 13, 1969, pages 68 and 69 to construct a night viewing apparatus comprising an image converter tube so that driving of the image converter does not require particular battery-driven voltage sources. A piezoelectric generator is manually operated and the voltage supplied by said generator is rectified by a rectifier and applied to a charging capacitor. A spark gap is connected between the rectifier and the charging capacitor, since the semiconductor rectifier exhibit too high a return current so that they would permanently discharge the capacitor, at which therefore the voltage required for driving the image converter could not be produced.

In operation this spark gap brings about some difficulties. The invention therefore is aimed at the elimination of this spark gap and the semiconductor rectifier.

In a viewing apparatus of the kind set forth in accordance with the invention the rectifier is a high-vacuum rectifier, which is arranged in the image converter tube.

The advantage of this arrangement resides in avoiding the return current in the rectifier path and in avoiding the use of a second vacuum vessel.

In a further embodiment of the invention the high-vacuum rectifier comprises a photo-cathode excited by the stray light of the phosphor screen of the image converter tube. The photo-cathode may then be directly connected with the anode of the image converter.

The high-vacuum rectifier may have two rectifier anodes, which are connected to two push-pull connected piezoelectric converters. The two piezoelectric converters may be mechanically connected with each other.

The arrangement having all the aforesaid features comprises therefore, apart from the image converter tube, only the piezoelectric converter of manual operation, whilst all other circuit elements are accommodated in the image converter tube.

One embodiment of the invention is shown in the drawings and will now be described more fully.

Figure 1:
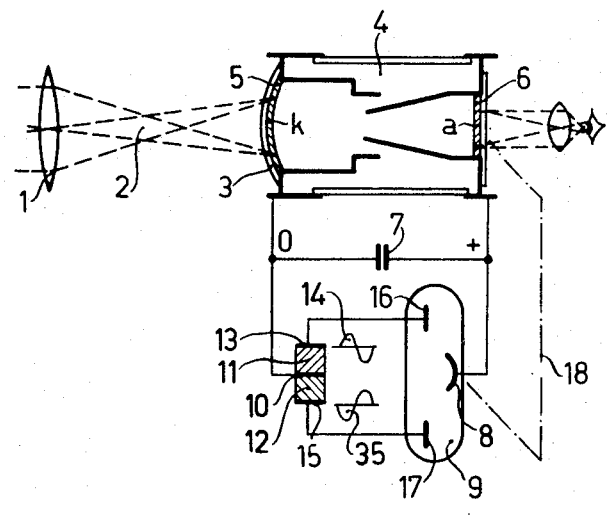
FIG. 1 shows the circuit arrangement comprising an image converter tube in accordance with the principle of the invention.

Referring to FIG. 1, reference numeral 1 designates the objective system of a viewing apparatus. The luminous rays, infrared or else ultraviolet rays, designated by 2 in FIG. 1, strike the cathode glass disc 3 of an image converter tube 4. They are converted in known manner in the image converter cathode 5 into photo-electrons and become visible on the phosphor screen 6 of the image converter tube 4.

The phosphor screen 6 of the image converter tube 4 is at anode potential and the image converter cathode 5 is at cathode potential. The charging capacitor 7 is connected accordingly. One terminal thereof is connected to the photo-cathode 8 of a high-vacuum rectifier 9 and the other terminal is connected to the junction 10 of two piezoelectric converters 11 and 12. By hand a pressure is exerted on these piezoelectric converters 11 and 12 so that a voltage as indicated by 14 is produced between the electric connections of the piezoelectric converter 11, that is to say the connections 10 and 13 and a voltage as indicated at 35, shifted in phase relatively to the voltage 14 is produced between the electric connections 10 and 15 of the piezoelectric converter 12.

These voltages 14 and 35 are applied with a phase shift to the two anodes 16 and 17 so that by this arrangement a highly continuous direct voltage is obtained for charging the capacitor 7. The broken line 18 represents the optical contact between the phosphor screen 6 and the photo-cathode 8 of the high-vacuum rectifier 9.

Figure 2:
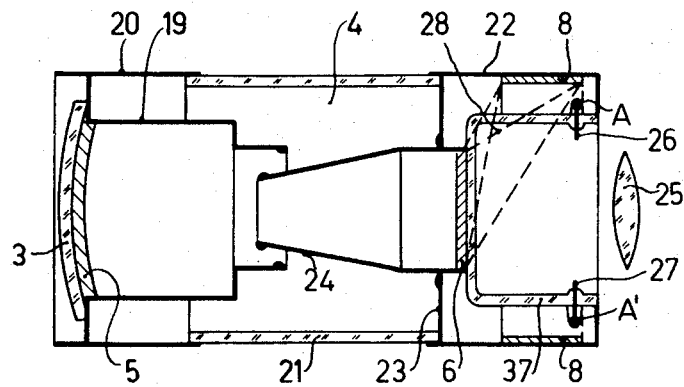
FIG. 2 shows the image converter tube in an embodiment given by way of example.

FIG. 2 shows on an enlarged scale an embodiment of the image converter tube 4. The cathode glass disc 3 is held in known manner with the image converter cathode 5 on one side of the image converter tube in a cathode holder 19, which is fastened in a cathode connecting ring 20. A glass bulb 21 provides the connection with an anode connecting ring 22. The anode connecting ring 22 comprises an electrically conductive contact ring 23 for establishing a connection to the anodeholder 24. In known manner the front part of the anode holder 24 and the rear part of the cathode holder 19 form an electric lens. At the rear the anode holder 24 is closed by the anode proper, that is to say by the phosphor screen 6. The latter is covered in known manner by a vapor-deposited aluminum layer and bears on the glass body of the phosphor screen 37. Through, for example, a magnifying optical system 25 the image on the phosphor screen 6 can be observed.

According to the invention, for example, the glass body 37 of the phosphor screen may accommodate high-vacuum rectifier anodes 26 and 27, which may be semi-circular. The so-called "cold cathode," that is to say the photo-cathode 8 of the high-vacuum rectifier 9 is arranged annularly on the inner wall of the anode connecting ring 22 and is struck and hence activated by the stray light as indicated at 28 and originating from the phosphor screen 6.

When an image appears on the phosphor screen 6, the high-vacuum rectifier 9 is at the same time ready for use with an appropriate relative arrangement of the electrode parts of the image converter tube 4 the electrode capacitances between the anode connecting ring 22 and the cathode connecting ring 20 may attain about 130 pF and can thus replace the capacitor 7 in accordance with the basic diagram of FIG. 1.

The photo-cathode 8 is directly arranged on the anode connecting ring 22 of the image converter tube 4 and is therefore at the latter's potential, that is to say, it is at the anode potential of the image converter tube so that, as will be apparent from FIG. 1, simplification of the arrangement can be obtained.

What is claimed is:

1. A viewing apparatus comprising an objective system; means for converting an image received through said objective system on an image converter cathode into an intensified visible image on a screen; capacitor means for building up an electric charge across said image converter cathode and said screen; a pair of piezoelectric converters arranged having a common connection to said image converter cathode and each having a second connection, said pair of piezoelectric converters being each disposed for generating a voltage of opposite polarity across said common connection and its said second connection when pressure is applied thereto; photo means for generating a current responsive to said visible image on said screen; and means for rectifying the current generated by both said photo means and said pair of piezoelectric converters, said second connection of said pair of piezoelectric converters being arranged with said means for rectifying in a push pull arrangement.

2. A viewing apparatus as claimed in claim 3 wherein said capacitor means is formed substantially only by the electrode capacitances of said image converter tube.

3. A viewing apparatus as claimed in claim 1 wherein said means for converting an image is an image converter tube.

4. A viewing apparatus as claimed in claim 3 wherein said means for rectifying is a high-vacuum rectifier having a pair of anodes, each of said anodes being in common with one of said second connections of said pair of piezoelectric converters so as to form a push pull circuit arrangement.

5. A viewing apparatus as claimed in claim 4 wherein said photo means is a photo-cathode of said high-vacuum rectifier, said photo-cathode being disposed in light receiving relationship with said screen, whereby said photo-cathode is excited by the stray light of said screen.

6. A viewing apparatus as claimed in claim 5 wherein said high-vacuum rectifier and said piezoelectric converters are in push-pull arrangement, each of said anodes being connected in common with said second connection of said piezoelectric converter and said piezoelectric converters and said high-vacuum rectifier are arranged in parallel connection with said capacitor means and with said image converter cathode and said screen.

* * * * *

PO-1050
(5/69)

UNITED STATES PATENT OFFICE
CERTIFICATE OF CORRECTION

Patent No. 3,693,017          Dated September 19, 1972

Inventor(s) FRANZ FICK and OTTO KOBELENTZ

It is certified that error appears in the above-identified patent and that said Letters Patent are hereby corrected as shown below:

In the heading:

after "[21] Appl. No.: 117,637" insert

-- Claims priority, application German, June 5, 1970,
                   P 2027780.9 --.

Signed and sealed this 13th day of February 1973.

(SEAL)
Attest:

EDWARD M. FLETCHER, JR.          ROBERT GOTTSCHALK
Attesting Officer               Commissioner of Patents